US012607474B2

(12) United States Patent
Hatori et al.

(10) Patent No.: US 12,607,474 B2
(45) Date of Patent: Apr. 21, 2026

(54) ROUTE SETTING DEVICE AND ROUTE SETTING SYSTEM

(71) Applicant: HONDA MOTOR CO., LTD., Tokyo (JP)

(72) Inventors: Satoshi Hatori, Wako (JP); Akifumi Yamashita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 174 days.

(21) Appl. No.: 18/550,390

(22) PCT Filed: Mar. 19, 2021

(86) PCT No.: PCT/JP2021/011365
§ 371 (c)(1),
(2) Date: Sep. 13, 2023

(87) PCT Pub. No.: WO2022/195847
PCT Pub. Date: Sep. 22, 2022

(65) Prior Publication Data
US 2024/0192008 A1 Jun. 13, 2024

(51) Int. Cl.
*G01C 21/34* (2006.01)
*G01C 21/36* (2006.01)

(52) U.S. Cl.
CPC ..... *G01C 21/3492* (2013.01); *G01C 21/3617* (2013.01)

(58) Field of Classification Search
None
See application file for complete search history.

(56) References Cited

U.S. PATENT DOCUMENTS 9,829,333 B1 * 11/2017 Calder .................. G06Q 10/08
2018/0267540 A1 9/2018 Sonoura
(Continued)

FOREIGN PATENT DOCUMENTS

JP 2015-014919 A 1/2015
JP 2018-156482 A 10/2018
(Continued)

OTHER PUBLICATIONS

Huber, Markus, et al., "Adjustments of Speed and Path when Avoiding Collisions with Another Pedestrian", Feb. 26, 2014, PLOS ONE (Year: 2014).*
(Continued)

*Primary Examiner* — Erin M Piateski
*Assistant Examiner* — Sarah A. Mueller
(74) *Attorney, Agent, or Firm* — Rankin, Hill & Clark LLP

(57) ABSTRACT

In order to reduce the number of avoidance actions, a route setting server includes map information storage device for storing map information in which the passerby quantity information indicating a passerby quantity is associated with a traveling path on which an autonomously traveling object travels autonomously, traffic frequency distribution identification device for identifying a passerby traffic frequency distribution in a predetermined area in which the traveling object travels autonomously, map information updating device for updating the passerby quantity information of the map information, based on the passerby traffic frequency distribution identified by the traffic frequency distribution identification device, and route determination device for determining a target route for the traveling object to travel based on the map information.

5 Claims, 10 Drawing Sheets

(56) References Cited

U.S. PATENT DOCUMENTS

| | | | | |
|---|---|---|---|---|
| 2018/0299284 A1* | 10/2018 | Wang | ................... | G08G 1/0112 |
| 2019/0213873 A1* | 7/2019 | Adireddy | ............. | G08G 1/0116 |
| 2020/0293053 A1 | 9/2020 | Hasegawa | | |
| 2020/0309548 A1* | 10/2020 | Shintani | ............. | G01C 21/3415 |
| 2020/0318987 A1* | 10/2020 | Soderberg | .......... | G01C 21/3697 |
| 2021/0033413 A1* | 2/2021 | Bae | .................... | G01C 21/3484 |
| 2021/0078598 A1* | 3/2021 | Kim | ....................... | B60K 35/22 |

FOREIGN PATENT DOCUMENTS

| | | |
|---|---|---|
| JP | 2020-149097 A | 9/2020 |
| WO | 2014/125802 A1 | 8/2014 |

OTHER PUBLICATIONS

International Search Report corresponding to International Application No. PCT/JP2021/011365 dated Jun. 8, 2021, 2 pages.
Written Opinion of the International Searching Authority corresponding to International Application No. PCT/JP2021/011365 dated Jun. 8, 2021, 3 pages.
International Preliminary Report on Patentability dated Sep. 12, 2023, Application No. PCT/JP2021/011365; 5 pages.

\* cited by examiner

ROUTE SETTING DEVICE AND ROUTE SETTING SYSTEM

Technical Field

The present invention relates to a route setting device and a route setting system.

BACKGROUND ART

There is a technique applied to a situation in which multiple moving objects are present around an autonomous mobile robot for determining a movement route capable of avoiding contact with these moving objects, based on the distance to each moving object and the speed of each moving object (e.g., refer to Patent Literature 1).

CITATION LIST

Patent Literature

[Patent Literature 1]
Japanese Patent Laid-Open No. 2020-149097

SUMMARY OF INVENTION

Technical Problem

However, according to the technique of Patent Literature 1, the robot performs an avoidance action in response to each occurrence of a situation in which the robot may come into contact with any moving object. Therefore, there is a problem that the time required to reach a destination becomes longer, due to reduction in robot's moving speed required for the avoidance action or movement on an unscheduled route required for the avoidance, compared to a case of moving on an originally scheduled route. This problem becomes more pronounced with increasing number of moving objects around the robot. Further, as a new problem, more complicated control will be required as well.

The present invention intends to provide a route setting device and a route setting system, which are capable of reducing the number of avoidance actions.

Solution to Problem

An aspect of the present invention is a route setting device including: map information storage means for storing map information in which passerby quantity information indicating a passerby quantity is associated with a traveling path on which an autonomously traveling object travels autonomously; traffic frequency distribution identification means for identifying a passerby traffic frequency distribution in a predetermined area in which the traveling object travels autonomously; map information updating means for updating the passerby quantity information of the map information, based on the passerby traffic frequency distribution identified by the traffic frequency distribution identification means; and route determination means for determining a target route for the traveling object to travel based on the map information.

According to another aspect of the present invention, in the above-described route setting device, the passerby quantity information is information temporally indicating the quantity of passersby who may be present on the traveling path, and the traffic frequency distribution indicates a passerby traffic frequency at each predetermined time about each of multiple spots set in the predetermined area including multiple traveling paths.

According to another aspect of the present invention, in the above-described route setting device, the traffic frequency distribution identification means identifies the passerby traffic frequency distribution based on collection information collected during autonomous traveling of the traveling object in the predetermined area.

According to another aspect of the present invention, in the above-described route setting device, the collection information includes information indicating a passerby movement state in the predetermined area.

According to another aspect of the present invention, in the above-described route setting device, the collection information includes traveling history information relating to the autonomous traveling obtained during the autonomous traveling of the traveling object in the predetermined area.

According to another aspect of the present invention, in the above-described route setting device, the traffic frequency distribution identification means identifies the passerby traffic frequency distribution based on information obtained through communication with an electronic device possessed by the passerby.

According to another aspect of the present invention, in the above-described route setting device, the traffic frequency distribution identification means identifies a temporal tendency of the passerby traffic frequency distribution.

Another aspect of the present invention is a route setting system including: an autonomously traveling object; map information storage means for storing map information in which passerby quantity information indicating a passerby quantity is associated with a path on which the traveling object travels autonomously; traffic frequency distribution identification means for identifying a passerby traffic frequency distribution in a predetermined area in which the traveling object travels autonomously; map information updating means for updating the passerby quantity information of the map information, based on the passerby traffic frequency distribution identified by the traffic frequency distribution identification means; and route determination means for determining a target route for the traveling object to travel based on the map information.

Advantageous Effects of Invention

According to the present invention, the number of avoidance actions can be reduced.

DESCRIPTION OF EMBODIMENTS

Figure 1:
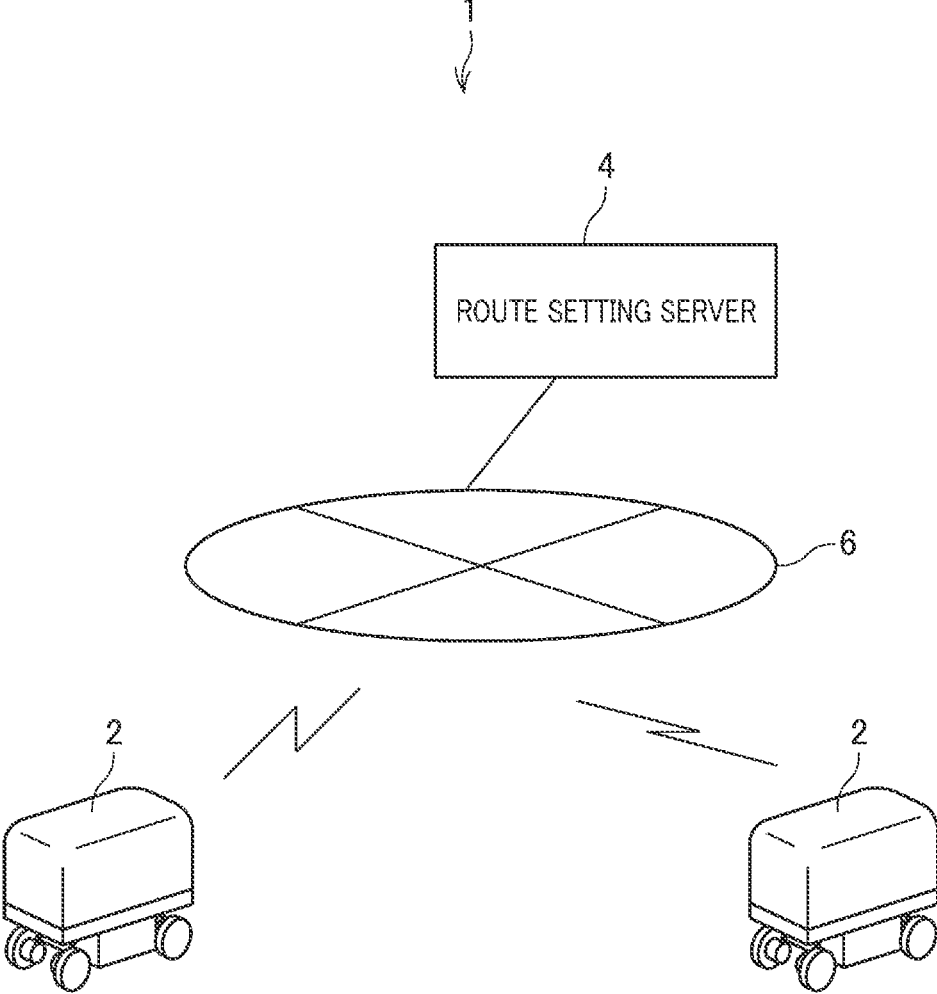
FIG. 1 is a configuration diagram illustrating a route setting system according to an embodiment of the present invention.
Figure 2:
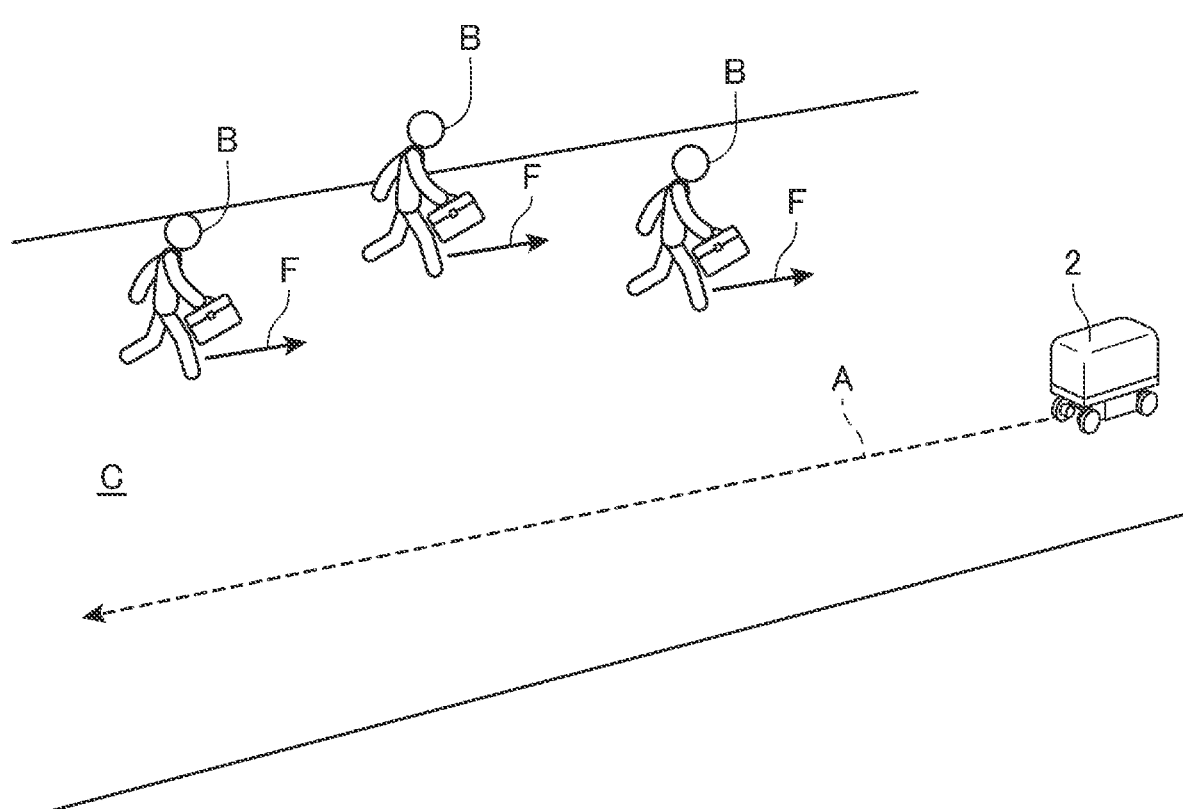
FIG. 2 is a diagram illustrating a traveling mode of a traveling object.

Hereinafter, an embodiment of the present invention will be described with reference to attached drawings. FIG. 1 is a configuration diagram illustrating a route setting system 1 according to the present embodiment. FIG. 2 is a diagram illustrating a traveling mode of a traveling object 2. The route setting system 1 is a system including one or more autonomously traveling objects 2 and a route setting server 4 that mutually communicates with each traveling object 2 via an electric telecommunication line 6, as illustrated in FIG. 1, in which the route setting server 4 sets a target route A on which the traveling object 2 travels autonomously. As illustrated in FIG. 2, the traveling object 2 is a device (e.g., a robot, a work machine, or a conveyance machine) that autonomously travels on the land according to the target route A including at least traveling in a predetermined area C. The predetermined area C is an arbitrary area through which passersby B pass and in which no traveling path is defined for the traveling object 2. The passersby B refer to pedestrians and light vehicles such as bicycles. For example, the predetermined area C includes roads (sidewalks, driveways such as roadside strips, etc.) for the passersby B and spaces (parks, parking lots, private properties, etc.) that each passerby B can pass through in an arbitrary direction.

The route setting server 4 identifies a route that avoids places where the passersby B are present relatively densely, in the predetermined area C, based on traffic frequency distribution information D1 (FIG. 4) about the predetermined area C, sets the target route A based on the identified route, and distributes the target route A to the traveling object 2 via the electric telecommunication line 6. The traffic frequency distribution information D1 is information indicating the temporal tendency of a passerby B traffic frequency distribution in the predetermined area C. In the present embodiment, the traffic frequency distribution information D1 is generated based on below-described collection information E (FIG. 3) that the traveling object 2 has collected during autonomous traveling. The traveling object 2 traveling on the target route A can reduce the number of interferences with the passersby B when traveling in the predetermined area C, and can reduce the time loss due to the interference. As a result, the traveling object 2 can reach a destination more quickly.

Hereinafter, the traveling object 2 and the route setting server 4 will be described in detail below.

Figure 3:
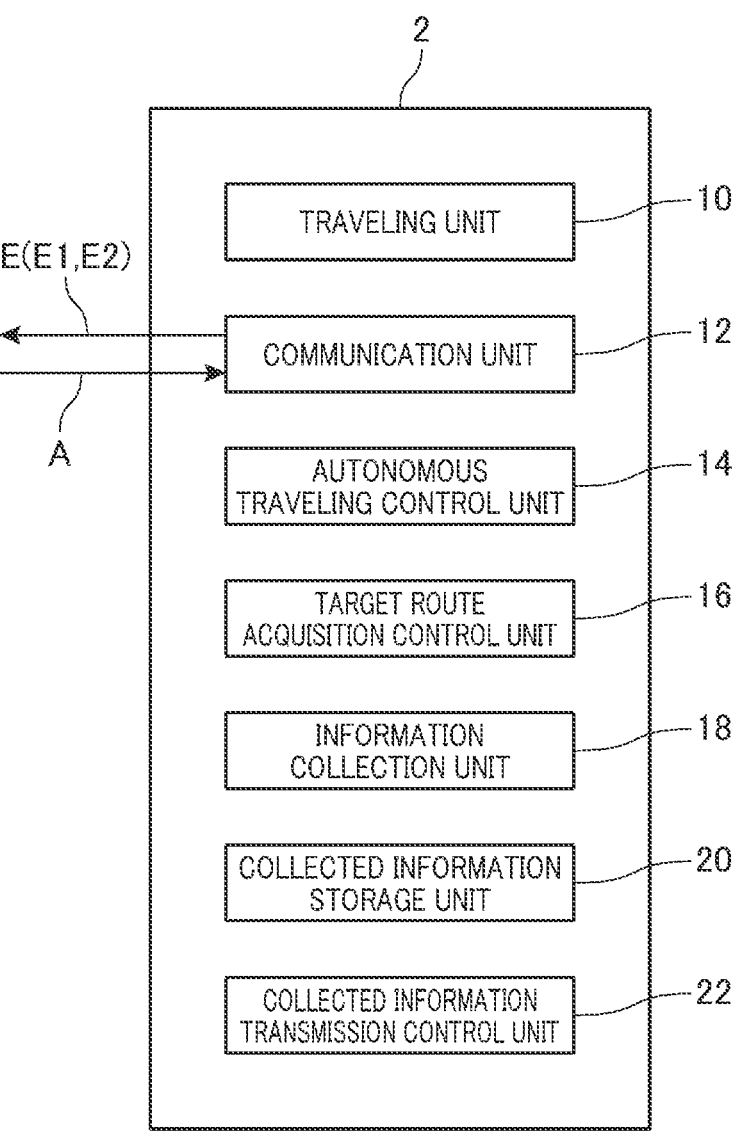
FIG. 3 is a diagram illustrating a functional configuration of the traveling object.

FIG. 3 is a diagram illustrating a functional configuration of the traveling object 2. The traveling object 2 includes a traveling unit 10, a communication unit 12, an autonomous traveling control unit 14, a target route acquisition control unit 16, an information collection unit 18, a collected information storage unit 20, and a collected information transmission control unit 22. The traveling unit 10 includes mechanical elements and electrical elements required for moving the body of the traveling object 2 by traveling. Specifically, the traveling unit 10 includes wheels, a steering mechanism for changing the steering angle of steering wheels, and a driving mechanism having a power source for driving the wheels. When the power source is an electric motor, the driving mechanism includes, for example, an inverter that drives this electric motor, a battery serving as an energy source, and a DC-DC converter that converts the power of this battery. The power source provided in the driving mechanism may be an internal combustion engine or a hybrid consisting of an electric motor and an internal combustion engine. The communication unit 12 includes a communication device (a device including a receiver circuit and a transmitter circuit) that mutually communicates with the route setting server 4 via the electric telecommunication line 6.

The autonomous traveling control unit 14 includes a computer that executes autonomous traveling control for controlling the traveling unit 10 so as to autonomously travel according to the target route A and avoidance traveling control for controlling the traveling unit 10 so as to travel while avoiding contact with obstacles such as the passersby B. A conventional or well-known appropriate control method may be used for the autonomous traveling control and the avoidance traveling control. Further, the traveling object 2 includes an appropriate sensor that detects information required for the autonomous traveling control and the avoidance traveling control.

The target route acquisition control unit 16 includes a computer that controls the communication unit 12 and acquires the target route A from the route setting server 4.

The information collection unit 18 is a device that collects, during autonomous traveling, first collection information E1 relating to the surrounding passersby B and second collection information E2 relating to autonomous traveling. The information collection unit 18 includes an appropriate sensor that collects the first collection information E1 and the second collection information E2, and a computer that generates the first collection information E1 and the second collection information E2 based on detection results of this sensor.

The first collection information E1 includes information indicating the movement state of the passersby B in the predetermined area C, which are time information, location information, and movement vector information, in the present embodiment. The time information indicates the time when the passerby B was detected, and the location information indicates the location of the passerby B in the predetermined area C. Further, the movement vector information indicates moving direction F (FIG. 2) and moving speed of the passerby B. To detect the first collection information E1, the information collection unit 18 includes a sensor (e.g., a camera, a LiDAR, or a TOF camera) for detecting the passerby B and generates the first collection information E1 based on a detection signal of this sensor.

The second collection information E2 is information including traveling history information relating to the autonomous traveling obtained during the autonomous traveling in the predetermined area C. For example, the second collection information E2 is information obtainable from various parameters and signals in the autonomous traveling control of the autonomous traveling control unit 14. In the present embodiment, the second collection information E2 includes traveling speed, stop information, avoidance information, route correction information, and required time. The traveling speed is information indicating an average traveling speed. The stop information indicates the time and location at which the stopping to avoid collision with a passerby B has been performed. The stop information is recorded, for example, when a passerby B crosses the route of the traveling object 2, when a passerby B moving in front of the traveling object 2 suddenly stops, or when a passerby B appears on the route of the traveling object 2 from a blind spot of the traveling object 2. The avoidance information is information about an avoidance action by which the traveling object 2 deviates from the route in order to avoid the passerby B, and includes the avoidance time/location at which this avoidance action has been performed. The route correction information indicates a route traveled when the traveling object 2 deviates from the target route A due to reasons other than the avoidance action. For example, when there is any spot where the traveling object 2 cannot advance due to new construction or repairment of a structure or the like on the target route A, the autonomous traveling control unit 14 controls the traveling object 2 so as to autonomously travel a detour route avoiding this spot. This detour route is recorded as route correction information. The required time is time required for passing through the predetermined area C.

The collected information storage unit 20 includes a storage device that stores the first collection information E1 and the second collection information E2 collected by the information collection unit 18. The collected information transmission control unit 22 includes a computer that transmits, to the route setting server 4, the collection information E including the first collection information E1 and the second collection information E2 stored in the collected information storage unit 20, by controlling the communication unit 12.

In the traveling object 2, all or some of the computers provided in the autonomous traveling control unit 14, the target route acquisition control unit 16, the information collection unit 18, and the collected information transmission control unit 22 may be realized by a single computer. The computer is a device including, at least, a processor such as a CPU or MPU, a memory device such as a ROM or RAM, and an interface circuit for connecting sensors, peripheral equipment, and the like.

Figure 4:
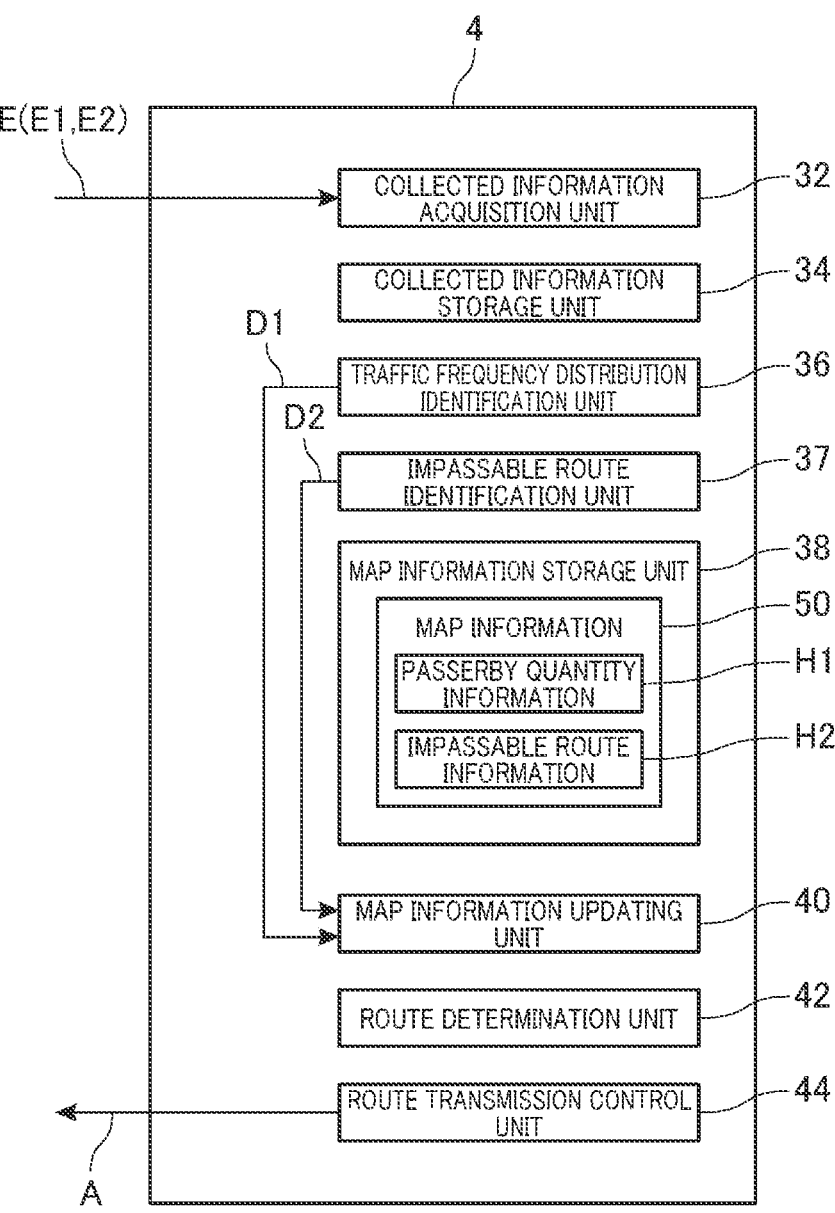
FIG. 4 is a diagram illustrating a functional configuration of a route setting server.

FIG. 4 is a diagram illustrating a functional configuration of the route setting server 4. The route setting server 4 is a computer that includes a processor such as a CPU or MPU, a memory device such as a ROM or RAM, a storage device such as an HDD or SSD, an interface circuit for connecting sensors, peripheral equipment, and the like, and a communication device (a reception device and a transmission device) for communication via the electric telecommunication line 6. The processor realizes the functional configuration illustrated in FIG. 4 by executing a computer program stored in the memory device or the storage device.

That is, as illustrated in FIG. 4, the route setting server 4 includes, as a functional configuration, a collected information acquisition unit 32, a collected information storage unit 34, a traffic frequency distribution identification unit 36, an impassable route identification unit 37, a map information storage unit 38, a map information updating unit 40, a route determination unit 42, and a route transmission control unit 44.

The collected information acquisition unit 32 acquires the collection information E from the traveling object 2, by using the communication device to receive the collection information E from the traveling object 2. The collected information storage unit 34 includes a storage device that stores the collection information E, so that the collection information E is accumulated in the collected information storage unit 34 each time the collection information E is received.

The traffic frequency distribution identification unit 36 generates the traffic frequency distribution information D1 indicating the temporal tendency of the passerby B traffic frequency distribution in the predetermined area C, based on the first collection information E1 of each collection information E stored in the collected information storage unit 34. The generation of the traffic frequency distribution information D1 is performed at appropriate timing, such as timing when newly accumulated collection information E reaches a certain amount, or timing when a certain period of time has passed.

Here, "temporal tendency" in the present embodiment refers to "change for each predetermined time zone", and the traffic frequency distribution information D1 is information indicating the passerby B traffic frequency distribution for each predetermined time zone. The predetermined time zone can be determined appropriately. For example, the predetermined time zone may be each time zone obtainable by dividing a day into predetermined time intervals. Further, for example, the predetermined time zone may be a time zone such as a commuting time zone, a daytime zone, or a midnight time zone.

Figure 5:
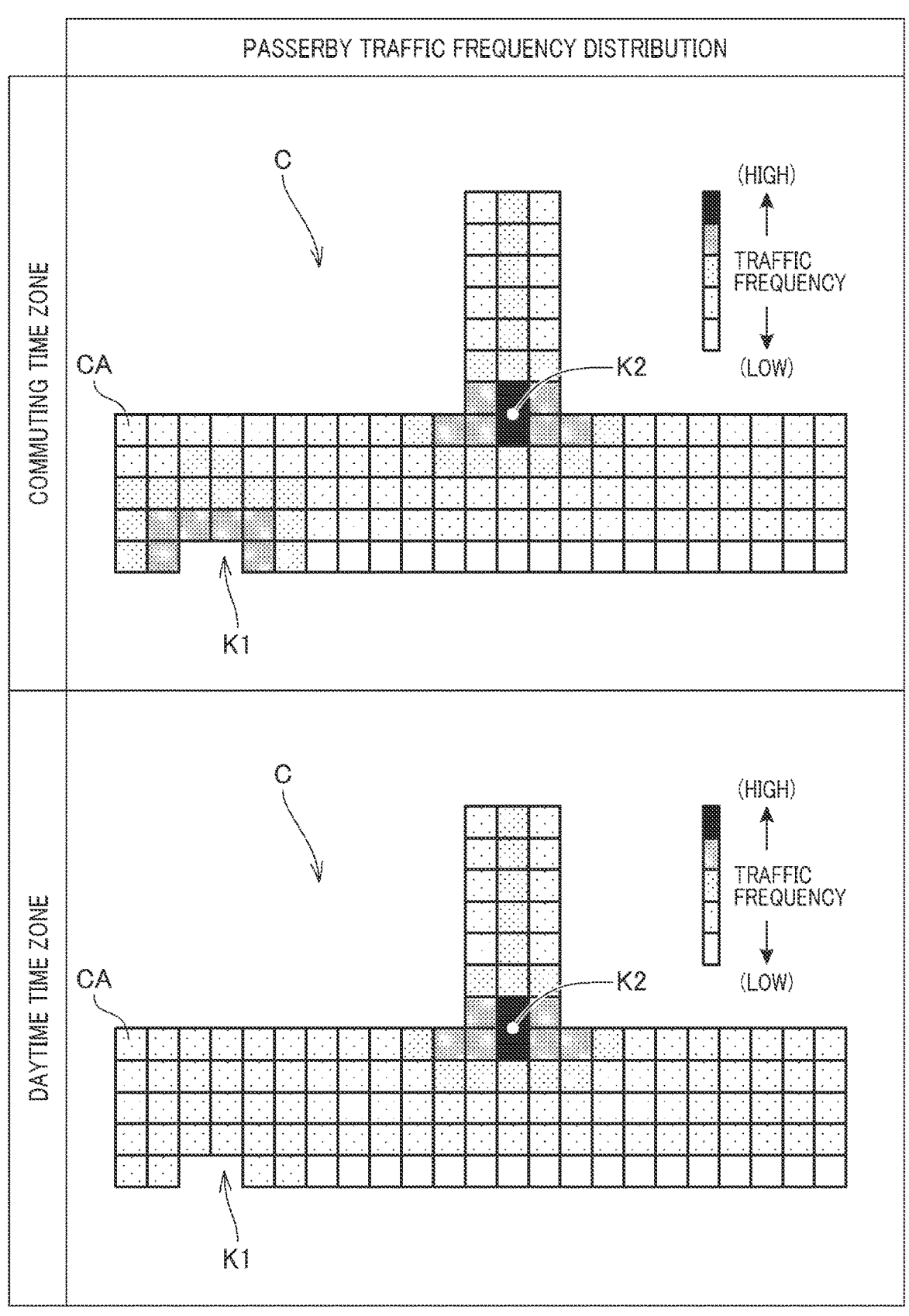
FIG. 5 is a diagram illustrating an exemplary passerby traffic frequency distribution about a predetermined area.

FIG. 5 is a diagram illustrating an exemplary passerby B traffic frequency distribution about the predetermined area C. As illustrated in this drawing, the passerby B traffic frequency distribution indicates a passerby B traffic frequency for each mesh CA obtained by subdividing the predetermined area C, in a certain predetermined time zone. The example of FIG. 5 illustrates the passerby B traffic frequency distribution in the predetermined area C including a place facing a school gate K1 and a T-shaped merging point K2, for each of the commuting time zone and the daytime zone. According to this drawing, it is understood that the predetermined area C has a tendency that in the commuting time zone the traffic frequency is higher both in the vicinity of the school gate K1 and at the T-shaped merging point K2 but in the daytime zone the traffic frequency is relatively lower in the vicinity of the school gate K1.

The traffic frequency distribution identification unit 36 identifies the passerby B traffic frequency in the following manner. That is, the traffic frequency distribution identification unit 36 first identifies a passerby B who is present in the predetermined area C in a certain predetermined time zone based on the time information of the first collection information E1. Next, the traffic frequency distribution identification unit 36 identifies each mesh CA to which the passerby B has moved in this time zone based on the location information and movement vector of the first collection information E1. Then, the traffic frequency distribution identification unit 36 counts passersby B who have moved through these meshes CA in all identified meshes CA. As a result, the counting of the passersby B is performed in each mesh CA to which the passerby B has moved, and the traffic frequency of each mesh CA can be obtained.

Further, in the present embodiment, the traffic frequency distribution identification unit 36 complements the passerby B traffic frequency distribution obtained as described above, based on the second collection information E2 included in the collection information E. Specifically, the traffic frequency distribution identification unit 36 compares the avoidance time/location indicated by the avoidance information of the second collection information E2 with the passerby B time/location information indicated by the first collection information E1, and identifies an avoidance action caused by a passerby B that is not indicated by the first collection information E1. Then, the traffic frequency distribution identification unit 36 complements the passerby B traffic frequency distribution by reflecting the presence of each passerby B on the traffic frequency of the mesh CA corresponding of an avoidance location.

In addition, the traffic frequency distribution identification unit 36 identifies the location/time of the stoppage performed to avoid collision with a passerby B, based on the stop information of the second collection information E2, and estimates the presence location/time of this passerby B based on the identified location/time. Then, the traffic frequency distribution identification unit 36 complements the passerby B traffic frequency distribution by reflecting the passerby B presence on the traffic frequency of the mesh CA corresponding to the estimated location.

In addition, when the traveling speed of the second collection information E2 is slower than an initially scheduled traveling speed, the traffic frequency distribution identification unit 36 presumes the presence of any passerby B in each of the meshes CA in which the traveling object 2 has autonomously traveled, and complements the passerby B traffic frequency distribution by reflecting the passerby B presence on traffic frequencies of these meshes CA.

The traffic frequency distribution identification unit 36 may identify the passerby B traffic frequency distribution, based on the second collection information E2, without using the first collection information E1. Specifically, the traffic frequency distribution identification unit 36 identifies the passerby B traffic frequency distribution about the predetermined area C by identifying the mesh CA where the presence of the passerby B is presumed, based on the traveling history information such as the avoidance information, stop information, and traveling speed of the second collection information E2. In this case, the information collection unit 18 of the traveling object 2 is not required to have a configuration for collecting the first collection information E1. Therefore, costs can be reduced.

The impassable route identification unit 37 identifies each impassable spot in the predetermined area C, based on the second collection information E2 (more accurately, route correction information) of the collection information E stored in the collected information storage unit 34, and generates impassable spot information D2 based on identification results.

The map information storage unit 38 includes a storage device for storing map information 50 usable for determining the target route A.

Figure 6:
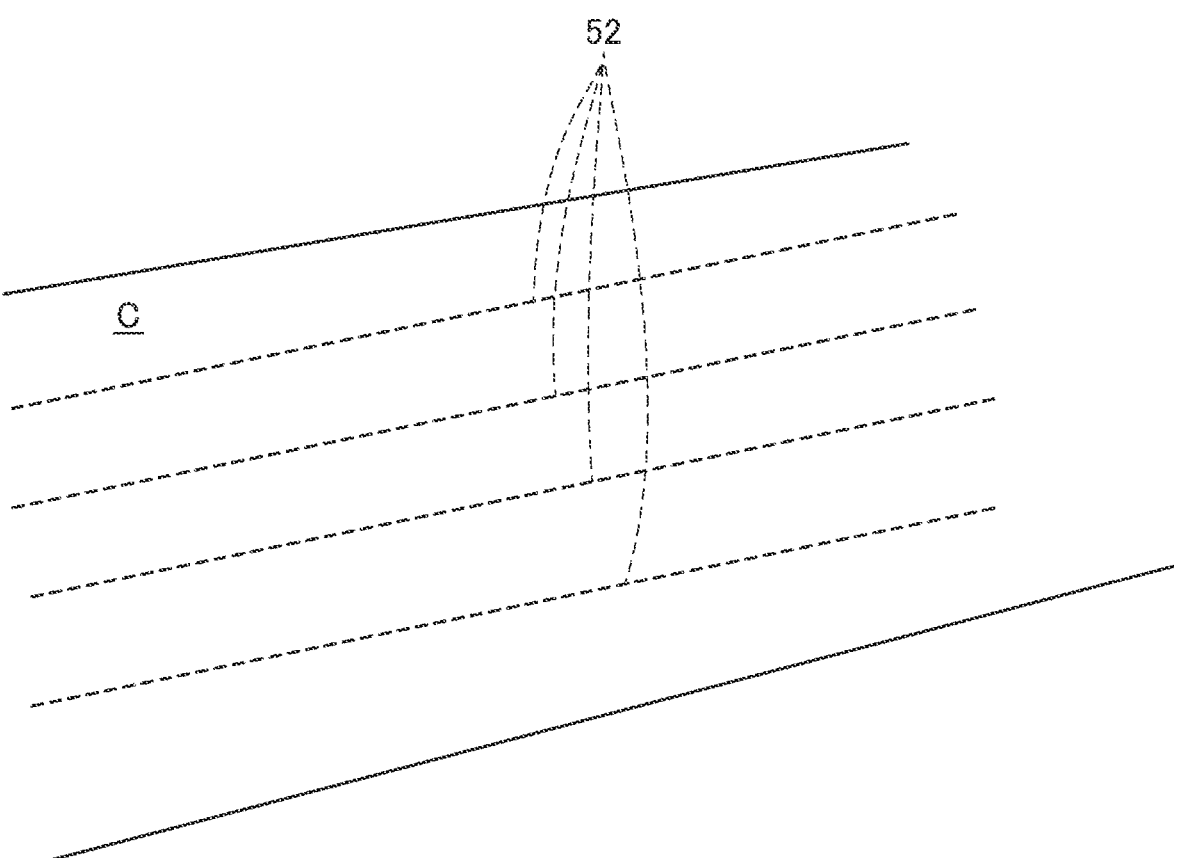
FIG. 6 is a diagram illustrating multiple links set in the predetermined area.

The map information 50 is information that defines a traveling path network covering traveling paths on which the traveling object 2 can travel. The traveling path network is represented by nodes set at characteristic points such as intersections, junctions, corners, and dead ends of respective traveling paths and linear links 52 connecting these nodes, in which each link 52 indicates the traveling path of the traveling object 2. In the map information 50 of the present embodiment, as illustrated in FIG. 6, the number of links 52 each connecting nodes is not limited to only one. The setting of multiple links 52 in parallel with each other depends on the size of the predetermined area C. As a result, traveling lanes (traveling paths parallel to each other) corresponding to respective links 52 are virtually set, in the predetermined area C.

Further, in the map information 50 of the present embodiment, each link 52 is associated with passerby quantity information H1 and impassable route information H2. The passerby quantity information H1 is information temporally indicating the quantity of the passersby B who may be present on the link 52 (for each predetermined time zone, in the present embodiment). The expression format of the quantity of the passersby B can be determined appropriately.

The quantity of the passersby B may be indicated using the number of the passersby B, or may be indicated using a grade reflecting the number of the passersby B. The impassable route information H2 is information indicating that traveling on the link 52 is temporally or permanently unable due to, for example, being under construction or installation of some kind of structure.

The map information updating unit 40 updates the passerby quantity information H1 of the map information 50 based on the traffic frequency distribution information D1 generated by the traffic frequency distribution identification unit 36, and updates the impassable route information H2 of the map information 50 based on the impassable spot information D2 generated by the impassable route identification unit 37. More specifically, the map information updating unit 40 identifies the passerby quantity, for each link 52 set in the predetermined area C, for each predetermined time zone, based on the traffic frequency distribution information D1, and updates the passerby quantity information H1 of each link 52 based on identification results. The map information updating unit 40 updates the map information 50 at appropriate timing such as the timing when the traffic frequency distribution information D1 or the impassable spot information D2 is newly generated.

The route determination unit 42 determines the target route A of the traveling object 2 based on the map information 50. Specifically, the route determination unit 42 identifies candidate routes each extending from a departure point to a destination point of the traveling object 2 based on the map information 50. Then, about the predetermined area C included in each candidate route, when multiple links 52 are set, the route determination unit 42 identifies a link 52 that is smaller in sum of passerby B traffic frequencies of respective meshes CA and minimum in number of impassable spots, in a traveling scheduled time zone of the traveling object 2, based on the passerby quantity information H1 and the impassable route information H2 of the map information 50, and determines a route including the identified link 52 as the target route A.

The route transmission control unit 44 causes the communication device to transmit the target route A determined by the route determination unit 42 to the traveling object 2 via the electric telecommunication line 6.

Figure 7:
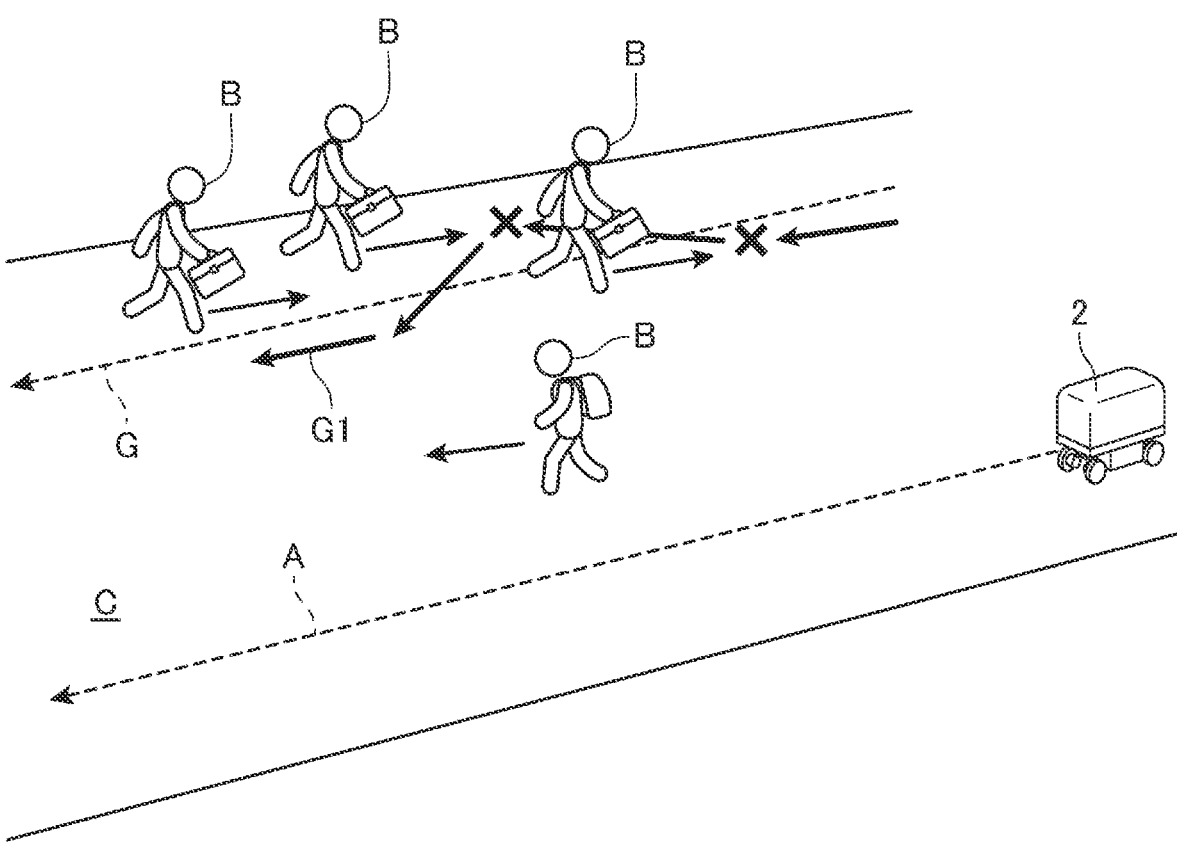
FIG. 7 is a diagram illustrating a relationship between passersby and a target route in the predetermined area.

FIG. 7 is a diagram illustrating a relationship between passersby B in the predetermined area C and the target route A set by the route setting server 4. As illustrated in this drawing, since the route setting server 4 sets the target route A so as to pass through a link 52 lower in passerby B traffic frequency in the predetermined area C, the traveling object 2 does not travel on a route G where many passerby B are expected to be on the route. If the traveling object 2 travels on the route G, the traveling object 2 will frequently come close to the passerby B and change its advancing direction due to an avoidance action performed each time. Therefore, an actual traveling route G1 becomes longer than the route G initially set and requires a longer time to travel. On the other hand, the target route A set by the route setting server 4 causes the traveling object 2 to pass through a place where the passerby B traffic frequency is low. Therefore, the number of avoidance actions decreases, and the traveling object 2 can reach the destination efficiently in a short time.

Figure 8:
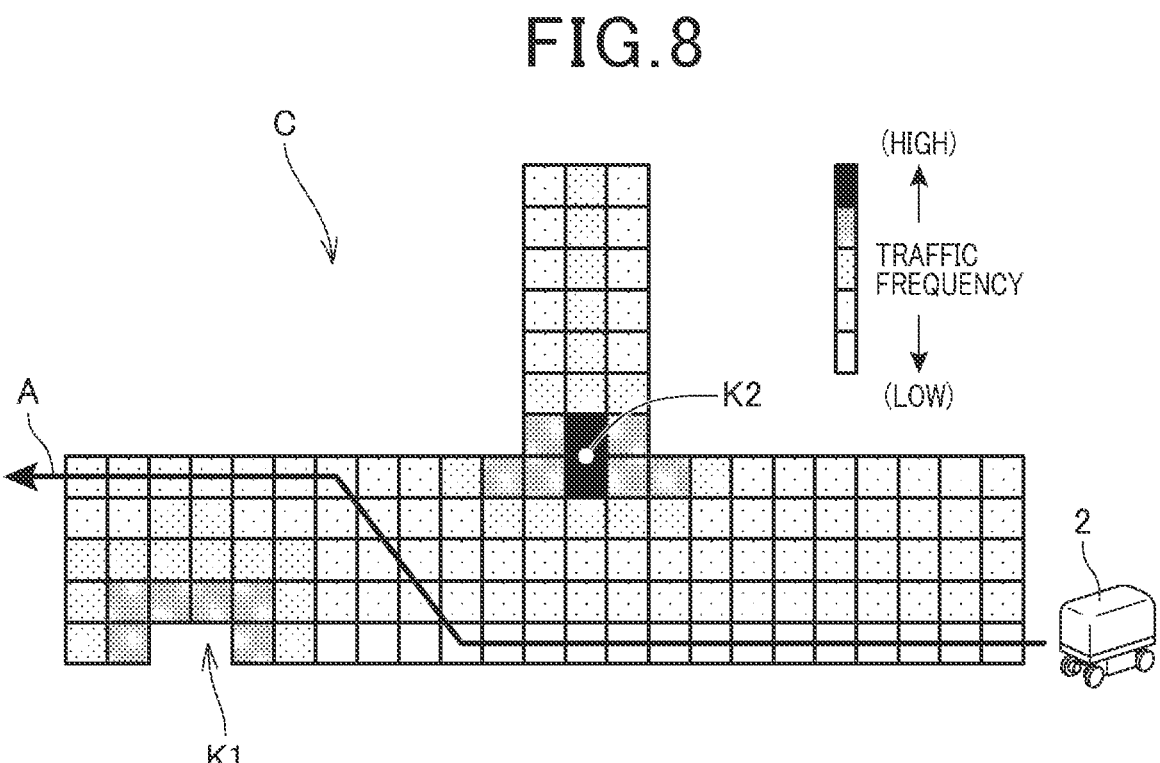
FIG. 8 is a diagram illustrating another setting example of the target route.

When determining a route in the predetermined area C, the route determination unit 42 may identify a route by connecting meshes CA whose passerby B traffic frequency is lower (equal to or less than a predetermined value) as illustrated in FIG. 8, instead of determining only one among from the links 52 set in the predetermined area C. In this case, the route determination unit 42 transmits, to the traveling object 2, the target route A with location information of each mesh CA included in the route. The traveling object 2 travels autonomously on the target route A, based on the location information of each mesh CA. Further, in this case, it is unnecessary to set, in the map information 50, multiple links 52 (FIG. 6) for forming virtual multiple traveling lanes in the predetermined area C in advance.

The present embodiment brings the following effects.

The route setting server 4 of the present embodiment includes the map information storage unit 38 that stores the map information 50 in which the passerby quantity information H1 indicating the quantity of the passerby B is associated with the link 52 (traveling path) on which the autonomously traveling object 2 travels autonomously, and the traffic frequency distribution identification unit 36 that identifies the passerby B traffic frequency distribution about the predetermined area C in which the traveling object 2 travels autonomously. Further, the route setting server 4 includes the map information updating unit 40 that updates the passerby quantity information H1 of the map information 50 based on the passerby B traffic frequency distribution, and the route determination unit 42 that determines the target route A for the traveling object 2 to travel based on the map information 50. According to this configuration, it is possible to set the target route A whose passerby B traffic frequency is lower, reduce the number of times the traveling object 2 interferes with the passersby B, and reduce the time loss due to the interference.

In the present embodiment, the passerby quantity information H1 is information temporally indicating the quantity of the passersby B who may be present on the link 52 (traveling path), and the traffic frequency distribution is information indicating the passerby B traffic frequency (number of passersby) at each predetermined time, for each of multiple meshes CA (spots) set in the predetermined area C including multiple links 52 (traveling paths). Acquiring the information indicating the passerby B traffic frequency (number of passersby) at each predetermined time for each of multiple meshes CA (spots) can accurately obtain the quantity of the passerby B for the link 52 (traveling path) passing through appropriate meshes CA.

In the present embodiment, the above-described traffic frequency distribution identification unit 36 identifies the passerby B traffic frequency distribution based on the collection information E collected during autonomous traveling of the traveling object 2 in the predetermined area C. According to this configuration, it is unnecessary to locate a device for observing the passersby B in the predetermined area C. Further, the traveling object 2 can collect the collection information E on the way to travel autonomously in the predetermined area C, and therefore it is possible to obtain the information for identifying the passerby B traffic frequency distribution efficiently at low costs.

In the present embodiment, the collection information E includes the first collection information E1 indicating the movement state of the passerby B in the predetermined area C. The passerby B traffic frequency in the predetermined area C can be accurately identified based on the first collection information E1.

In the present embodiment, the collection information E includes the traveling history information relating to the autonomous traveling obtained during autonomous traveling of the traveling object 2 in the predetermined area C. As a result, the above-described traffic frequency distribution identification unit 36 can identify the passerby B traffic frequency distribution based on the traveling history information of the traveling object 2. Therefore, costs can be further reduced.

In the present embodiment, the above-described traffic frequency distribution identification unit 36 identifies the temporal tendency of the passerby B traffic frequency distribution. Therefore, it is possible to set the target route A appropriately in accordance with the scheduled time at which the traveling object 2 passes through the predetermined area C.

The above-described embodiment is merely an exemplary aspect of the present invention and can be arbitrarily modified and applicable without departing from the gist of the present invention.

Modified Example 1

Figure 9:
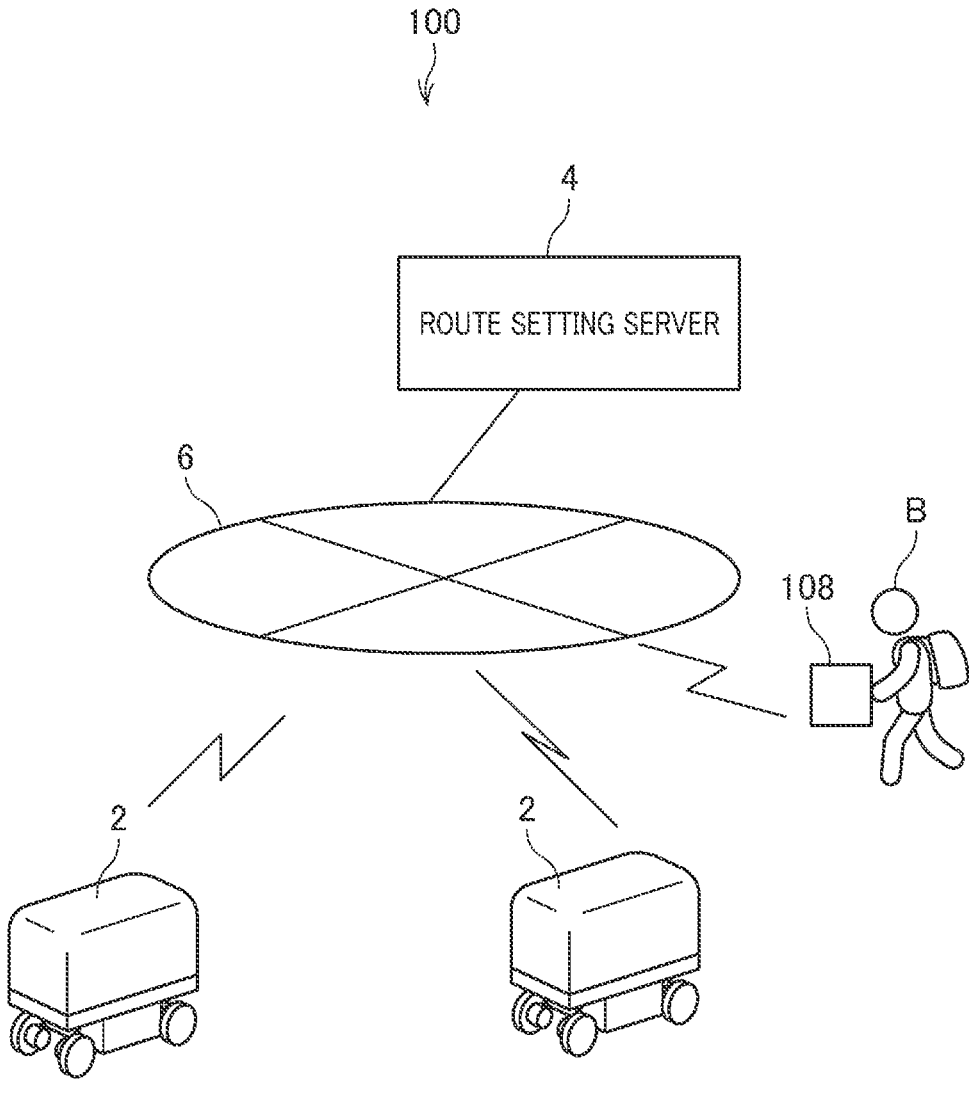
FIG. 9 is a configuration diagram illustrating a route setting system according to a modified example of the present invention.

In the above-described embodiment, the route setting server 4 acquires the collection information E from the traveling object 2, and identifies the passerby B traffic frequency distribution about the predetermined area C based on the acquired collection information E. However, the route setting server 4 may identify the passerby B traffic frequency distribution, by communicating with the passerby B who passes through the predetermined area C. That is, the route setting system 100 according to this modified example includes, as illustrated in FIG. 9, a portable electronic device 108 possessed by the passerby B in addition to one or more autonomously traveling objects 2 and the route setting server 4.

Figure 10:
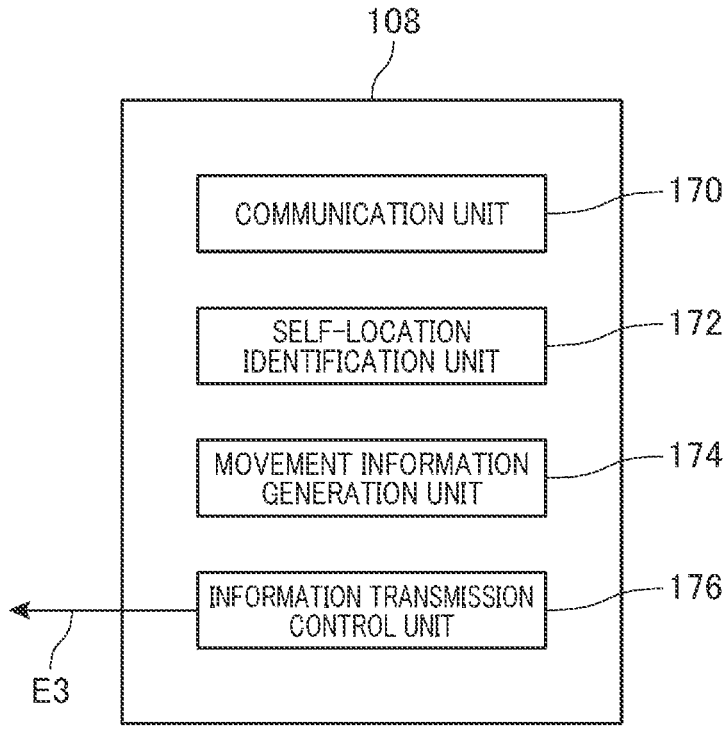
FIG. 10 is a diagram illustrating a functional configuration of a portable electronic device.

FIG. 10 is a diagram illustrating a functional configuration of the portable electronic device 108. The portable electronic device 108 is a device such as a mobile phone, a smartphone, a tablet PC, a notebook PC, an electronic notebook, or a portable crime prevention device, which can be carried by a user. The portable electronic device 108 of the present embodiment includes, as illustrated in FIG. 10, a communication unit 170, a self-location identification unit 172, a movement information generation unit 174, and an information transmission control unit 176.

The communication unit 170 includes a communication device (a device including a receiver circuit and a transmitter circuit) that mutually communicates with the route setting server 4 via the electric telecommunication line 6. The self-location identification unit 172 includes a device for identifying the self-location, more specifically, a sensor (e.g., GNSS sensor) for detecting the self-location and a computer for identifying the self-location based on detection results of this sensor. The computer sequentially identifies the self-location. Based on self-location identification results, the movement information generation unit 174 sequentially generates movement information E3 indicating the present location of the passerby B, movement vector (moving direction and moving speed), and time. The information transmission control unit 176 includes a computer that controls the communication unit 170 to transmit the movement information E3 to the route setting server 4. The transmission timing of the movement information E3 is appropriate, and may be every fixed time, or every generation timing of a predetermined number of pieces of movement information E3.

In the portable electronic device 108, all or some of the computers provided in the self-location identification unit 172, the movement information generation unit 174, and the information transmission control unit 176 may be realized by a single computer.

The route setting server 4 receives the movement information E3 through communication with the portable electronic device 108, identifies each mesh CA to which the passerby B has moved in the predetermined area C based on the movement information E3, and obtains the traffic frequency for each mesh CA in the predetermined area C based on the identification results. As a result, the passerby B traffic frequency distribution about the predetermined area C can be identified.

According to this modified example, the traffic frequency distribution is identified based on the movement information E3 of the portable electronic device 108 possessed by the passerby B, and therefore the traffic frequency distribution can be obtained with high accuracy.

In this modified example, similar to the above-described embodiment, the route setting server 4 can increases the accuracy by identifying the passerby B traffic frequency distribution using the collection information E received from the traveling object 2.

Modified Example 2

In the above-described embodiment, the map information updating unit 40 of the route setting server 4 may update the information about the traveling path (link 52 and node) recorded in the map information 50, based on the collection information E collected by the traveling object 2. For example, the map information updating unit 40 determines whether a new traveling path not included in the map information 50 is included in the detour route included in the route correction information of the collection information E. If a new traveling path is included, this traveling path is added to the map information 50. As a result, the map information 50 can be updated sequentially.

Modified Example 3

In the above-described embodiment, the traveling object 2 may include the route setting function of the route setting server 4, so that the traveling object 2 may set the target route A by itself. Specifically, the traveling object 2 further includes the traffic frequency distribution identification unit 36, the impassable route identification unit 37, the map information storage unit 38, the map information updating unit 40, and the route determination unit 42, and sets the target route A in the same manner as the route setting server 4. In this case, the traveling object 2 corresponds to the route setting device.

Other Modified Example

In the above-described embodiment, the traveling object 2 is exemplified as an autonomously traveling mobile body. However, the means for moving such a mobile body is arbitrary, and is not limited to the means using wheels. For example, the means for movement may be walking.

REFERENCE SIGNS LIST

1, 100: route setting system
2: traveling object (mobile body)
4: route setting server (route setting device)
14: autonomous traveling control unit
18: information collection unit
36: traffic frequency distribution identification unit
37: impassable route identification unit
38: map information storage unit

40: map information updating unit
42: route determination unit
50: map information
52: link (traveling path)
108: portable electronic device
A: target route
B: passerby
C: predetermined area
D1: traffic frequency distribution information
D2: impassable spot information
E: collection information
E1: first collection information
E2: second collection information
E3: movement information
H1: passerby quantity information

The invention claimed is:

1. A route setting system comprising:
an autonomously traveling object;
a memory storing map information in which passerby quantity information indicating a passerby quantity of a passerby is associated with a traveling path on which the traveling object travels autonomously; and
a processor,
the processor being configured to mutually communicate with the traveling object via an electric telecommunication line, wherein
the processor is configured:
to identify a passerby traffic frequency distribution in a predetermined area in which the traveling object travels autonomously;
to update the passerby quantity information of the map information, based on the passerby traffic frequency distribution identified; and
to determine a target route for the traveling object to travel based on the map information,
the processor:
identifies the passerby traffic frequency distribution in the predetermined area based on collection information collected during autonomous traveling of the traveling object in the predetermined area, and
sets the target route so as to pass through a place whose passerby traffic frequency in the predetermined area is equal to or less than a predetermined value,
the traveling object includes: a computer that executes avoidance traveling control so as to travel while avoiding contact with the passerby; and a sensor that detects the collection information,
the collection information includes traveling history information relating to the autonomous traveling obtained during the autonomous traveling of the traveling object in the predetermined area,
the traveling history information includes:
stop information that indicates a stopping time and location at which stopping of the traveling object to avoid collision with the passerby has been performed; and
avoidance information that is information about an avoidance action by which the traveling object deviates from a route in order to avoid the passerby, and includes an avoidance time and location at which the avoidance action has been performed.

2. The route setting system according to claim 1, wherein the passerby quantity information is information temporally indicating the quantity of passersby who may be present on the traveling path, and the traffic frequency distribution indicates the passerby traffic frequency at each predetermined time about each of multiple spots set in the predetermined area including multiple traveling paths.

3. The route setting system according to claim 1, wherein the collection information includes information indicating a passerby movement state in the predetermined area.

4. The route setting system according to claim 1, wherein the processor identifies the passerby traffic frequency distribution based on information obtained through communication with an electronic device possessed by the passerby.

5. The route setting system according to claim 1, wherein the processor identifies a temporal tendency of the passerby traffic frequency distribution.

\* \* \* \* \*